United States Patent [19]
Ukita et al.

[11] 3,725,492
[45] Apr. 3, 1973

[54] PROCESS FOR THE PREPARATION OF LIQUID POLYBUTADIENE

[75] Inventors: Keizo Ukita; Toshimasa Sadamori, both of Tokuyama, Japan

[73] Assignee: The Japanese Geon Company, Ltd., Tokyo, Japan

[22] Filed: Oct. 26, 1970

[21] Appl. No.: 83,832

[52] U.S. Cl. ............................................260/680 B
[51] Int. Cl. ................................................C08f 3/18
[58] Field of Search .................................260/680 B

[56] References Cited

UNITED STATES PATENTS 3,066,127  11/1962  Carlson et al. ......................260/94.3
3,312,752  4/1967  Schleimer...........................260/680

Primary Examiner—Paul M. Coughlan, Jr.
Attorney—Sherman and Shalloway

[57] ABSTRACT

A process for the preparation of liquid polybutadiene of an average molecular weight of 1,000 – 20,000 containing at least 70 percent of cis-1,4 configuration, which comprises initiating the polymerization of butadiene in a 15 – 70 weight percent butadiene solution in butene-1, in the presence a catalyst system obtained by mixing together an organoaluminum compound of the formula $R_nAlCl_{3-n}$, wherein R is an aliphatic hydrocarbon residue of 1 – 6 carbon atoms and $n$ is a number from 1 to 2, an organonickel compound and water.

8 Claims, 1 Drawing Figure

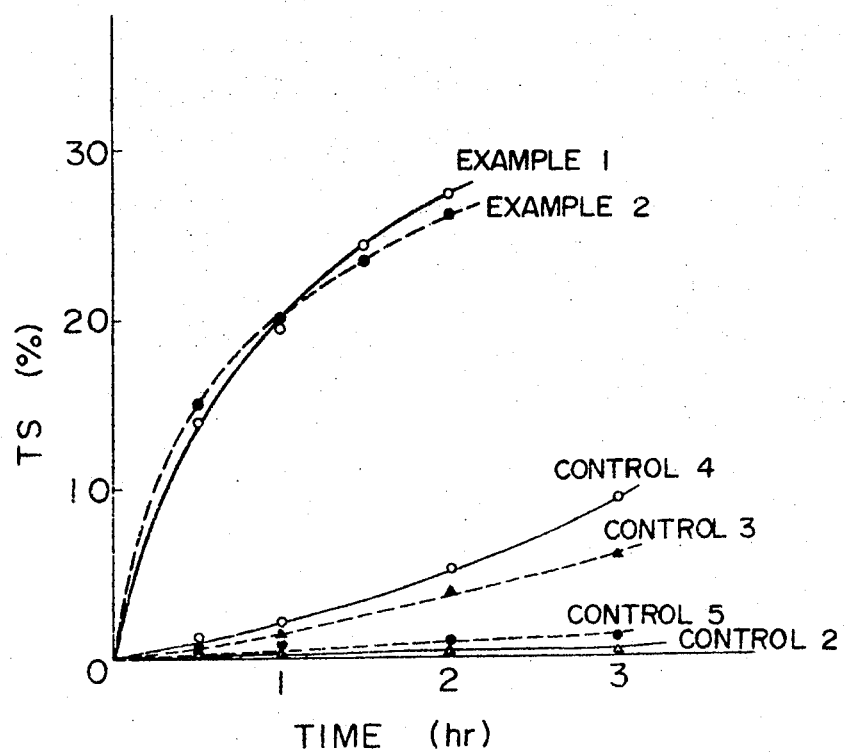

PROCESS FOR THE PREPARATION OF LIQUID POLYBUTADIENE

This invention relates to a process for the preparation of liquid polybutadiene. More specifically, the invention relates to a process for preparing liquid polybutadiene wherein in preparing a liquid polybutadiene containing at least 70 percent of the cis-1,4 configurations by means of the solution polymerization of butadiene the polymerization reaction is carried out in a butene-1 medium using a catalyst system consisting of an organoaluminum compound of the formula $R_nAlCl_{3-n}$, wherein R is an aliphatic hydrocarbon residue of 1 – 6 carbon atoms and $n$ is 1 – 2, an organonickel compound and water.

As catalysts for preparing liquid polybutadiene, the organometallic compounds such as butyl lithium and boron fluoride have been known in the past. These catalysts provide a liquid polybutadiene in which the vinyl and trans-1,4 configurations predominate with the cis-1,4 configuration being less than 60 percent. Lately, processes for preparing liquid polybutadiene which contain above 70 percent of the cis-1,4 configuration have been developed, for example, such as those disclosed in German Pat. No. 1,186,631 and U. S. Pat. No. 3,329,734. Both of these processes use a catalyst system consisting of an organoaluminum compound and a nickel compound in preparing the liquid polybutadiene. In the former process numerous conditions must be strictly observed, one being that of using an aluminum sesquihalide and a nickel compound mixed in a specified ratio (0.25 mol of the nickel compound to one mol of the aluminum compound) and another being the requirement that the polymerization reaction must be carried out at an exceedingly low temperature such as 0°C. On the other hand, in the latter process either a method of using a molecular weight modifier in a solvent mixture of an aliphatic hydrocarbon and an aromatic hydrocarbon, or a method of prop polymerizing butadiene while maintaining a low concentration of the butadiene must be employed, or else the liquid polybutadiene cannot be obtained. When a molecular weight modifier is used as indicated hereinabove, the adjustment of the molecular weight at one's option not only becomes difficult but also another major drawback is that the reaction speed drops rapidly, with the consequence that a large amount of the catalyst, and particularly a large quantity of the nickel compound, becomes necessary. The use of a large amount of the catalyst is not only uneconomical but also brings about undesirable changes in the resulting product, such as its discoloration.

An object of the present invention resides in improving upon the foregoing drawbacks and providing a stable process for the preparation of liquid polybutadiene. Another object is to provide such a process in which not only the polymerization speed is high but also the economy of which is great.

Other objects and advantages of the invention will be apparent from the following description.

The foregoing objects of the present invention can be achieved by using, in the preparation of a liquid polybutadiene containing at least 70 percent of the cis-1,4 configuration by the solution polymerization of butadiene, a catalyst system consisting of an organoaluminum compound of the formula $R_nAlCl_{3-n}$, wherein R is an aliphatic hydrocarbon residue of 1 – 6 carbon atoms and $n$ is 1 – 2, an organonickel compound and water, and carrying out the polymerization reaction with butene-1 as the medium.

Since in accordance with the invention process the catalyst has a much higher activity than that of the conventional catalysts, the polymerization speed is exceedingly high. In consequence, the liquid polybutadiene can be prepared efficiently without causing a substantial decline in the reaction speed even when the amount of catalyst used is small. Further, the molecular weight of the polymer and the polymerization speed can be controlled by varying either the molar ratio of the catalyst components of water to organoaluminum or the monomeric concentration. In addition, the polymerization operation is simplified in that there is no need to prop polymerize the butadiene. Also the recovery of the solvent is greatly simplified since high boiling solvents, such as benzene, are not used. Thus, in accordance with the invention process a liquid polybutadiene having an optional molecular weight can be prepared with a very good productivity by means of stable operating conditions.

The accompanying drawing is a graph depicting a time-TS curve for demonstrating the high activity of the catalyst system of the invention.

According to the invention process, the preparation of a liquid polybutadiene of an optional average molecular weight of 1,000 – 20,000 becomes possible by using the butene-1 solvent in an amount suitably chosen from the range of 30 – 85 percent by weight relative to the total amount of the butadiene and the butene-1, i.e., by initiating the polymerization of the butadiene in a 15 – 70 weight percent solution of butadiene in butene-1. According to the invention process, there is no need to use a molecular weight modifier in addition to the butene-1 which is used as a solvent. The conjoint use of a molecular weight modifier would not be an advantage but would instead cause a rapid decline in the reaction speed and bring about undesirable results as to the productivity as well as in other respects.

The liquid polybutadiene obtained in accordance with the invention process contains at least 70 percent of the cis-1,4 configuration and not more than 10 percent of the vinyl configuration, and its average molecular weight is 1,000 – 20,000 and intrinsic viscosity, as measured in toluene at 30°C., is 0.08 – 0.4.

As typical examples of the organoaluminum compounds of the aforesaid general formula, one of the components of the catalyst used in this invention, mention can be made of such as dimethylaluminum chloride, diethylaluminum chloride, diisobutylaluminum chloride, dihexylaluminum chloride, methylaluminum dichloride, ethylaluminum dichloride, propylaluminum dichloride and ethylaluminum sesquichloride. While these may be used singly, two or more of these aluminum compounds, for example, diethylaluminum chloride and ethyl-aluminum chloride mixed in a suitable amount, can also be used.

The organonickel compound, one of the other components used in the invention catalyst, is a compound which is soluble in butene-1, which is used as the solvent, and the butadiene monomer. Included are, for example, the nickel salts of the aliphatic, alicyclic and aromatic carboxylic acids such as nickel acetate, nickel stearate, nickel oleate, nickel naphthenate, nickel benzoate etc., the complex salts such as nickel acetylacetonate, nickel benzoyl acetonate, bis-cyclopentadienyl nickel, pyridine complex of nickel chloride etc., and nickel carbonyl.

As long as the composition of the organoaluminum compound, organonickel compound and water is varied within the range indicted hereinunder, it can be used effectively as a catalyst in the present invention. Accordingly, a molar ratio of the organonickel compound to the organoaluminum compound in the range of 0.003 – 0.15, and preferably 0.008 – 0.04, is preferred. When the amount of the organonickel compound is less than this range, a marked decrease in the polymerization activity of the catalyst takes place. On the other hand, when the amount of the organonickel compound exceeds this range, the nickel compound, rather than bringing about a marked increase in the polymerization activity, remains in the resulting polymer and causes discoloring of the polymer which is undesirable. The molar ratio of water to the organoaluminum compound can be varied within the range 0.1 – 1.0, and preferably 0.2 – 0.8. When water is absent or is present in an amount less than that indicated in the foregoing range, a marked decline takes place in the polymerization activity of the catalyst.

These three components may be mixed in any sequence. While a catalyst system which can achieve the intended objects of the invention can be formed regardless of the sequence of the mixing operation, particularly preferred is the sequence in which water is first added to a mixture of butadiene and butene-1 and, after thorough stirring, the organoaluminum compound and the organonickel compound are added in the order given. The invention catalyst system can be suitably used in the range of 0.0004 – 0.01 mol percent of the organonickel compound relative to the butadiene monomer.

According to the invention process, the concentrations of the organoaluminum compound and the organonickel compound, which are used as the catalyst, can be respectively reduced to as much as one-fifth to one-tenth and one-fifteenth to one-hundredth that of the conventional method which uses a molecular weight modifier.

The butene-1, which is used as a solvent in the present invention, must be used, as hereinbefore noted, in an amount ranging from 30 percent to 85 percent by weight based on the total amount of the butadiene and butene-1. If butene-1 is used in excess of 85 percent, separation of the polymer takes place and troubles occur, since butene-1 is a poor solvent for polybutadiene. On the other hand, when the amount is less than 30 percent, polybutadiene of high molecular weight forms and liquid polybutadiene cannot be obtained.

The usual solution polymerization technique can be employed for carrying out the polymerization, and it is preferred that the polymerization reaction be carried out at a temperature ranging from −40° to 100°C.

After obtaining the liquid polybutadiene as described hereinabove, the catalyst contained therein is first decomposed with a material such as water, alcohol or ketone and then, with or without removing the catalyst residue, the unreacted butadiene and butene-1 can be recovered in customary manner either by distillation or driving out with steam. In accordance with the invention process, since it is possible to prepare the liquid polybutadiene with a small amount of catalyst and accordingly the product can be used, as obtained, without the necessity of removal of the catalyst with any special means, the process possesses economic advantages.

The liquid polybutadiene obtained as hereinabove described is a commercially valuable material in that it can be used as a high-molecular-weight plasticizer, coating material and adhesive, or as a material for mixing with asphalt.

The following examples are given for illustrating the invention more specifically. In the examples, the intrinsic viscosity $[\eta]$ is a value measured in toluene at 30°C., and the molecular weight is a value measured with a molecular weight measurement apparatus manufactured by Hitachi Limited, Japan.

EXAMPLE 1

A thoroughly dried 500-ml polymerization vessel was filled with dry nitrogen, after which it was charged with 40 grams of butadiene and 60 grams of butene-1 both dehydrated with a molecular sieve, followed by the addition of 0.009 gram of distilled water and stirring for 30 minutes to accomplish the homogeneous dispersion of the water. Next, after adding 0.1 gram of diethylaluminum chloride and 0.004 gram of nickel naphthenate in the sequence given, the polymerization was carried out for 2 hours at 20°C.

The time-TS curve (conversion to polymer per unit time) of this reaction is shown in the accompanying drawing.

The polymerization reaction was terminated by the addition of 0.1 ml of methanol, after which 1.2 parts by weight of 2,6-ditertiary butyl-p-cresol was added and the unreacted butadiene and butene-1 were recovered by distillation to yield 27.6 grams of liquid polybutadiene.

The intrinsic viscosity $[\eta]$ of the so obtained liquid polybutadiene was 0.22. The microstructure of this liquid polybutadiene, when analyzed by means of infrared spectrum analysis, was as follows: 86.5 percent cis-1,4 configuration, 10.0 percent trans-1,4-configuration, 3.5 percent vinyl configuration.

Control 1

Example 1 was repeated except that 60 grams of benzene were used instead of butene-1, whereupon 32 grams of a solid polymer having an intrinsic viscosity $[\eta]$ of 0.78 were obtained.

EXAMPLE 2

Example 1 was repeated except that 0.1 gram of ethylaluminum sesquichloride was used instead of diethylaluminum chloride and the amount of water used was 0.006 gram, whereupon 26.2 grams of a liquid polybutadiene having an intrinsic viscosity $[\eta]$ of 0.17 were obtained. The time-TS curve obtained in this case is shown in the accompanying drawing.

The microstructure of the so obtained liquid polybutadiene was as follows: 80.4 percent cis-1,4 configurations, 15.4 percent trans-1,4 configurations, 4.2 percent vinyl configurations.

EXAMPLE 3

Except that 0.7 gram of diethylaluminum chloride and 0.3 gram of ethylaluminum dichloride were used instead of diethylaluminum chloride and the water was used in an amount of 0.006 gram, the exact procedures described in Example 1 were otherwise repeated. As a result, 26.8 grams of a liquid polybutadiene having an intrinsic viscosity $[\eta]$ of 0.18 were obtained.

EXAMPLES 4–6

A thoroughly dried 500-ml polymerization vessel was filled with dry nitrogen, after which it was charged with 100 grams of a mixture of butadiene and butene-1 (see Table 3). Next 0.009 gram of water was added and by thorough stirring homogeneously dispersed in the mixture, followed by the addition of 0.1 gram of diethylaluminum chloride and 0.002 – 0.007 gram of nickel naphthenate (see Table 3) in the sequence given, and thereafter the polymerization reaction was carried out for 2 hours at 20°C. The results obtained are shown in Table 3. It can be seen from these results that the molecular weight of the liquid polybutadiene formed can be adjusted at will by suitably varying the amount of butene-1 used.

TABLE 3

| Example | Butadiene (g) | Butene-1 (g) | Nickel naphthenate (g) | TS (percent/ initial one hr.) | Final TS (percent) | Intrinsic viscosity $[\eta]$ | Molecular weight | Microstructure (percent) | | |
|---|---|---|---|---|---|---|---|---|---|---|
| | | | | | | | | cis-1,4 | trans-1,4 | vinyl |
| 4 | 18 | 82 | 0.007 | 11.8 | 14.5 | 0.09 | 1500 | 82.4 | 12.9 | 4.7 |
| 5 | 40 | 60 | 0.004 | 15.0 | 23.0 | 0.2 | 7000 | 84.0 | 11.7 | 4.3 |
| 6 | 60 | 40 | 0.002 | 16.5 | 25.2 | 0.4 | 20,000 | 92.5 | 5.5 | 2.0 |

Controls 2 and 3

A thoroughly dried 500-ml polymerization vessel was filled with dry nitrogen, after which it was charged with 40 grams of butadiene and 60 grams of butene-1 both dehydrated with a molecular sieve. As the catalyst, 0.1 gram of an organoaluminum compound (see Table 1) and 0.006 gram of nickel naphthonate were added, following which the polymerization reaction was carried out for 3 hours at 20°C. The results obtained are shown in Table 1, and the time-TS curves in this case are shown in the accompanying drawing. As is apparent from this table, it is seen that in the case of a catalyst system devoid of water the reaction speed is exceedingly slow as compared with Examples 1 and 2.

TABLE 1

| Control | Organo-aluminum compound (part) | TS* (percent/ initial one hr.) | Final TS (percent) | Intrinsic viscosity $[\eta]$ | Microstructure (percent) | | |
|---|---|---|---|---|---|---|---|
| | | | | | cis-1,4 | trans-1,4 | vinyl |
| 2 | 0.1 diethylaluminum chloride | 0.5 | 0.7 | | 77.1 | 19.6 | 3.4 |
| 3 | 0.1 ethylaluminum sesqui-chloride | 1.6 | 6.2 | 0.11 | 78.4 | 20.6 | 1.0 |

*Percent by weight of resulting polymer present in reaction system.

Controls 4 and 5

Example 1 was repeated except that as a molecular weight modifier were added 1,000 ppm (Control 4) and 2,000 ppm (Control 5) of 1,2-butadiene and that the polymerization was carried out for 3 hours at 20°C. The results obtained are shown in Table 2, and the time-TS curves in this case are shown in the accompanying drawing. As is apparent from the drawing, a rapid decline in the reaction speed takes place in the case where 1,2-butadiene is added.

TABLE 2

| Control | Amount of 1,2-butadiene added (p.p.m.) | TS* (percent/ initial one hr.) | Final TS (percent) | Intrinsic viscosity $[\eta]$ | Microstructure (percent) | | |
|---|---|---|---|---|---|---|---|
| | | | | | cis-1,4 | trans-1,4 | vinyl |
| 4 | 1000 | 3.0 | 9.0 | 0.23 | 81.9 | 12.5 | 5.5 |
| 5 | 2000 | 0.6 | 1.0 | 0.13 | 83.5 | 13.6 | 2.8 |

*Percent by weight of resulting polymer present in reaction system.

We claim:

1. A process for the preparation of a liquid polybutadiene of an average molecular weight of 1,000 – 20,000 containing at least 70 percent cis-1,4 configuration, which comprises initiating the polymerization of butadiene in a 15 – 70 weight percent butadiene solution in butene-1, in the presence of a catalyst system obtained by mixing together an organoaluminum compound of the formula $R_nAlCl_{3-n}$, wherein R is an aliphatic hydrocarbon residue of 1 – 6 carbon atoms and n is a number from 1 to 2, an organonickel compound selected from nickel salts of organic carboxylic acids, organic complexes of nickel and nickel carbonyl and water, said organonickel compound being present in an amount of 0.0004 – 0.01 mol percent based on the amount of said butadiene.

2. A process for the preparation of a liquid polybutadiene of an average molecular weight of 1,000 – 20,000 containing at least 70 percent cis-1,4 configuration, which comprises initiating the polymerization of butadiene in a 15 – 70 weight percent butadiene solution in butene-1, in the presence of a catalyst system obtained by mixing together an organoaluminum chloride of the formula $R_nAlCl_{3-n}$, wherein R is an aliphatic hydrocarbon residue of 1 – 6 carbon atoms and n is a number from 1 – 2, an organonickel compound selected from nickel salts of organic carboxylic acids, organic complexes of nickel and nickel carbonyl and water in such a proportion that the molar ratio of said organonickel compound to said organoaluminum chloride is 0.003 – 0.15 and the molar ratio of the water to said organoaluminum chloride is 0.1 – 1.0, said organonickel compound being present in an amount of 0.0004 – 0.01 mol percent based on the amount of said butadiene.

3. The process of claim 1 wherein said liquid polybutadiene has an intrinsic viscosity as measured in toluene at 30°C. of 0.08 – 0.04.

4. The process of claim 2 wherein said liquid polybutadiene has an intrinsic viscosity as measured in toluene at 30°C. of 0.08 – 0.04.

5. The process of claim 2 wherein the molar ratio of said organonickel compound to said organoaluminum chloride is within the range of 0.008 – 0.04.

6. The process of claim 2 wherein the molar ratio of water to said organoaluminum chloride is 0.2 – 0.8.

7. The process of claim 1 wherein the catalyst system is prepared by first adding water to a mixture of butadiene and butene-1, and after stirring, adding to the mixture said organoaluminum compound and organonickel compound.

8. The process of claim 2 wherein the catalyst system is prepared by fist adding water to a mixture of butadiene and butene-1 and, after stirring, adding to the mixture said organoaluminum chloride and organonickel compound.

* * * * *